(12) United States Patent
Gobinath et al.

(10) Patent No.: US 9,108,476 B2
(45) Date of Patent: Aug. 18, 2015

(54) BYPASS AIR MAINTENANCE TIRE AND PUMP ASSEMBLY

(75) Inventors: Thulasiram Gobinath, Hudson, OH (US); Cheng-Hsiung Lin, Hudson, OH (US); Robert Leon Benedict, Tallmadge, OH (US); Richard Nicholas Crano, Akron, OH (US); Adam Joseph O'Donnell, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 476 days.

(21) Appl. No.: 13/553,246

(22) Filed: Jul. 19, 2012

(65) Prior Publication Data

US 2014/0020805 A1    Jan. 23, 2014

(51) Int. Cl.
*B60C 23/10*     (2006.01)
*B60C 23/12*     (2006.01)

(52) U.S. Cl.
CPC ......... *B60C 23/12* (2013.01); *Y10T 152/10495* (2015.01)

(58) Field of Classification Search
CPC ........ B60C 23/10; B60C 23/12; B60C 23/004
USPC .......................................... 152/419, 423–426
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 3,304,981 A | 2/1967 | Sheppard | |
| 3,833,041 A | 9/1974 | Glad et al. | 152/347 |
| 3,867,973 A | 2/1975 | Cozzolino et al. | 152/153 |
| 3,882,678 A | 5/1975 | Fassbender | 60/405 |
| 4,922,984 A | 5/1990 | Dosjoub et al. | 152/415 |
| 5,052,456 A | 10/1991 | Dosjoub | 152/415 |
| 7,117,731 B2 | 10/2006 | Hrabal | 73/146 |
| 7,225,845 B2 | 6/2007 | Ellmann | 152/426 |
| 8,042,586 B2 | 10/2011 | Losey et al. | 152/426 |
| 8,113,254 B2 | 2/2012 | Benedict | 152/426 |
| 2009/0294006 A1 | 12/2009 | Hrabal | 152/426 |
| 2011/0272073 A1 | 11/2011 | Losey | 152/340.1 |
| 2014/0000778 A1* | 1/2014 | Gobinath | 152/450 |
| 2015/0041036 A1* | 2/2015 | Lin | 152/450 |

FOREIGN PATENT DOCUMENTS

| | | | | |
|---|---|---|---|---|
| DE | 3433318 | | 3/1986 | ............. B60C 23/00 |
| EP | 2384912 | | 11/2011 | ............. B60C 23/12 |

(Continued)

OTHER PUBLICATIONS

European Search Report received by Applicants Sep. 30, 2013.

*Primary Examiner* — Jason Bellinger
(74) *Attorney, Agent, or Firm* — Richard B. O'Planick

(57) ABSTRACT

An air maintenance tire and pump assembly includes a pair of inline valves are positioned on respective opposite sides of an in-tire air passageway inlet junction and a pair of outlet valves positioned at a downstream side of a respective inline valve. A bypass valve is further provided extending between the downstream valve sides of the inline valves, the bypass valve operative to open and bypass the flow of inlet air through the outlet valves to the tire cavity in the event that a tire cavity pressure is greater than a preset pressure level and close when a tire cavity pressure is less than the preset pressure level.

16 Claims, 13 Drawing Sheets

(56) References Cited

FOREIGN PATENT DOCUMENTS

| EP | 2433822 | 3/2012 | ............. B60C 23/12 |
| EP | 2468540 | 6/2012 | ............. B60C 23/12 |
| RU | 2106978 | 3/1998 | ............. B60C 23/12 |
| WO | 03/049958 | 6/2003 | ............. B60C 23/12 |
| WO | 2005/012009 | 2/2005 | ............. B60C 23/00 |
| WO | 2007/134556 | 11/2007 | ............. B60C 23/00 |
| WO | 2009/103252 | 8/2009 | ............. B60C 23/12 |
| WO | 2010/008338 | 1/2010 | ............. B60C 23/12 |

* cited by examiner

BYPASS AIR MAINTENANCE TIRE AND PUMP ASSEMBLY

FIELD OF THE INVENTION

The invention relates generally to air maintenance tires and, more specifically, to a tire and integrated pump assembly.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will maintain correct air pressure within the tire without a need for driver intervention to compensate for any reduction in tire pressure over time.

SUMMARY OF THE INVENTION

According to an aspect of the invention, an air maintenance tire and pump assembly is provided, the pump assembly including an elongate annular air passageway enclosed within a bending region of a tire, the air passageway operatively closing and opening segment by segment as the bending region of the tire passes through a rolling tire footprint to pump air along the air passageway. The pump assembly further includes an air inlet port assembly coupled to channel outside air into the air passageway at an inlet junction; a pair of inline valves positioned to direct a flow of the inlet air in opposite directions into the air passageway; and a pair of outlet valves, each positioned at a downstream side of a respective inline valve, the outlet valves directing a bi-directional flow of the inlet air from the downstream side of a respective inline valve toward the tire cavity. A bypass valve is further provided extending between the downstream valve sides of the inline valves, the bypass valve operative to open and bypass the flow of inlet air through the outlet valves to the tire cavity in the event that a tire cavity pressure is greater than a preset pressure level and close when a tire cavity pressure is less than the preset pressure level.

In another aspect, the bypass valve opens bi-directionally to allow a bypass air flow into the air passageway in opposite directions with the bypass valve is in the open condition.

The invention in a further aspect is configured wherein the bypass valve has opposite bypass valve ends connecting respectively to the air passageway between a downstream side of a respective inline valve and an upstream side of a respective outlet valve.

According to another aspect, the direction of air flow through the bypass valve with the bypass valve in the open condition is dictated by alternative rotational directions of the tire.

A further aspect is that the inline and the outlet valves are selectively opened by bi-directional air flow within the air passageway and wherein the direction of bi-directional air flow is dictated the forward and reverse directions in which the tire rotates.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Ball check valve" is a check valve in which the closing member, the movable part to block the air flow, is a spherical ball. In some ball check valves, the ball is spring-loaded to help keep it shut and require a specified magnitude of upstream pressure on the ball to overcome the bias of the valve spring for the valve to open. The interior surface of the main seats of ball check valves may be conically-tapered to guide the ball into the seat and form a positive seal when stopping reverse flow.

"Chafer" is a narrow strip of material placed around the outside of a tire bead to protect the cord plies from wearing and cutting against the rim and distribute the flexing above the rim.

"Check valve" is a two-port valve having two openings in the body, one for air to enter and the other for air to leave.

"Circumferential" means lines or directions extending along the perimeter of the surface of the annular tread perpendicular to the axial direction.

"Cracking pressure" is the minimum upstream pressure at which the valve will operate. Typically, a check valve is designed for and can therefore be specified for a specific cracking pressure.

"Downstream" is a direction away from the source of power, i.e. the direction away from the source of air flow. In the context of a valve, "downstream" refers to a side of the valve from which air flows out of the valve when an "upstream" air flow on the valve exerts cracking pressure sufficient to open the valve.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a sidewall that may extend circumferentially or laterally about the tread in a straight, curved, or zigzag manner. Circumferentially and laterally extending grooves sometimes have common portions. The "groove width" is equal to the surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

"Upstream" is a direction toward the source of air flow power, i.e. the direction from which air flows or is coming from. In the context of a valve, "upstream" refers to a side of the valve into which air flows when an "upstream" air flow on the valve exerts cracking pressure sufficient to open the valve.

BRIEF DESCRIPTION OF THE DRAWINGS

The invention will be described by way of example and with reference to the accompanying drawings in which.

DETAILED DESCRIPTION OF THE INVENTION

Figure 1:
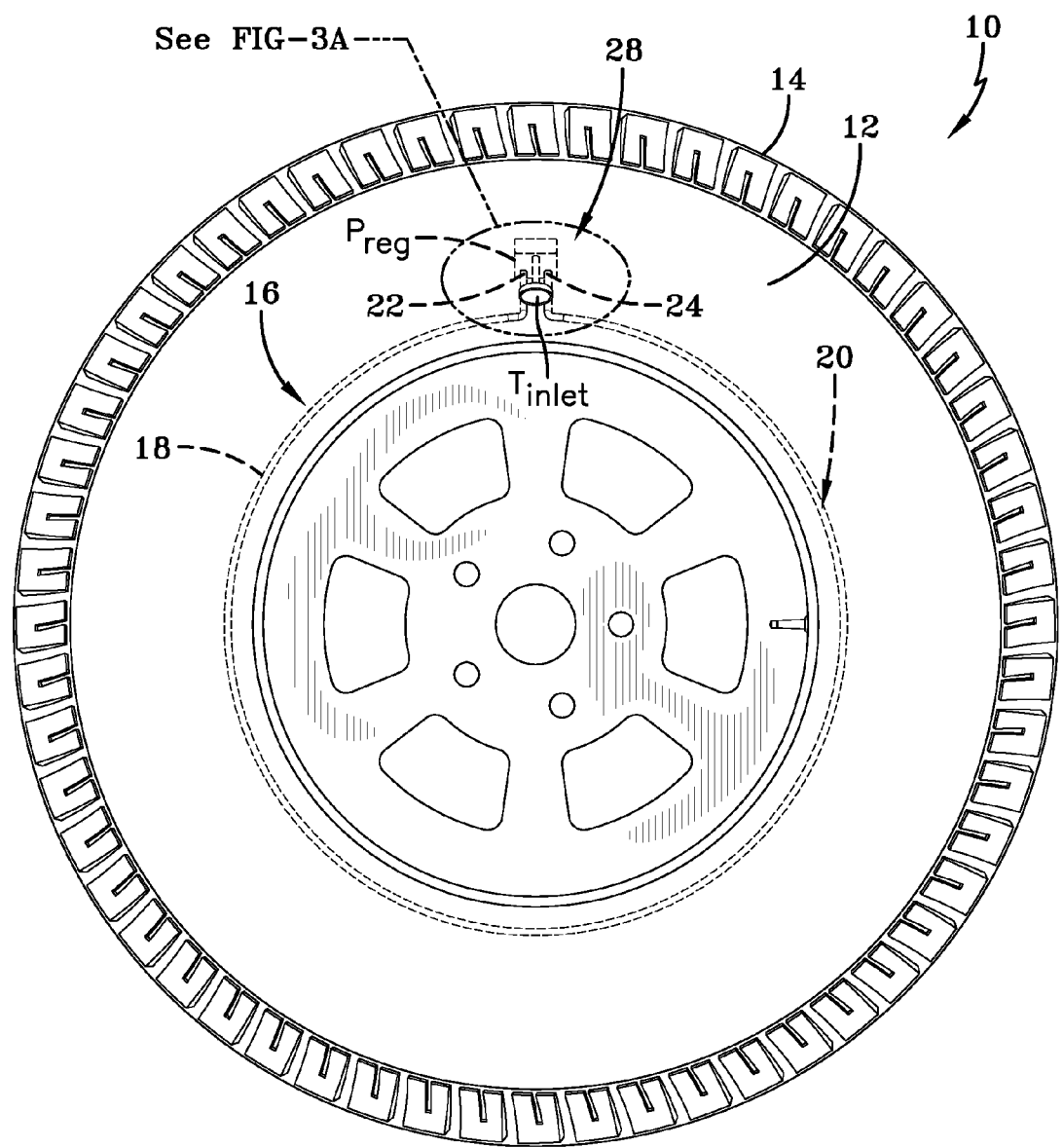
FIG. 1 is an isometric view of tire, rim and tubing with peristaltic pump and inlet valve.

Referring to FIGS. 1, 2A, 2B and 3A, a tire and pump assembly includes a tire of conventional construction having a pair of sidewalls 12 extending to a tread 14 and enclosing a tire air cavity 26 defined by a tire inner liner layer 25. A peristaltic pump assembly 16, air entering at $T_{inlet}$, is attached to one or both of the tire sidewalls 12 in generally a high bend region of the sidewall. The peristaltic pump assembly 16 includes an annular air passageway 20 either in the form of an independent tube formed separately from the tie and assembled to the tire in a post-manufacture procedure; or an air passageway formed as an integral void within the sidewall during tire manufacture. The air passageway 20 is enclosed by the sidewall and extends along an annular path about a region of the sidewall that experiences a high flex or bend as the tire rotates. If in an independent tube form, the air passageway tube is formed of a resilient, flexible material such as plastic or rubber compounds that are capable of withstanding repeated deformation cycles wherein the tube is deformed into a flattened condition subject to external force and, upon removal of such force, returns to an original condition generally circular in cross-section. If the air passageway is integrally formed within the sidewall, the air passageway likewise must withstand repeated deformation and recovery cycles as the tire rotates and be of a diameter sufficient to operatively pass a volume of air sufficient for the purposes described herein. The general operation of an air tube in a peristaltic pump is described in U.S. Pat. No. 8,113,254 which is incorporated herein by reference.

Opposite ends 22, 24 of the air passageway terminate at an inlet port assembly 28. The inlet port assembly is affixed to rotate with the tire as the tire rotates against a ground surface 132. Rotation of the tire creates a footprint 134 against surface 132 which in turn introduces compression force 138 into the tire. The compression force 138 in turn is applied at 140 into the air passageway 20 causing segment by segment collapse of the passageway as the tire rotates. The segment by segment collapse of the air passageway occurs regardless of whether the tire rotates in the counterclockwise direction 136 of FIG. 2A or the clockwise direction 133 of FIG. 2B. The peristaltic pump assembly is thus said to be bi-directional or reversible in operating to pump air into the tire cavity 26 in both a forward or a reverse direction of air flow continuously throughout a 360 degree tire rotation.

Figure 2A:
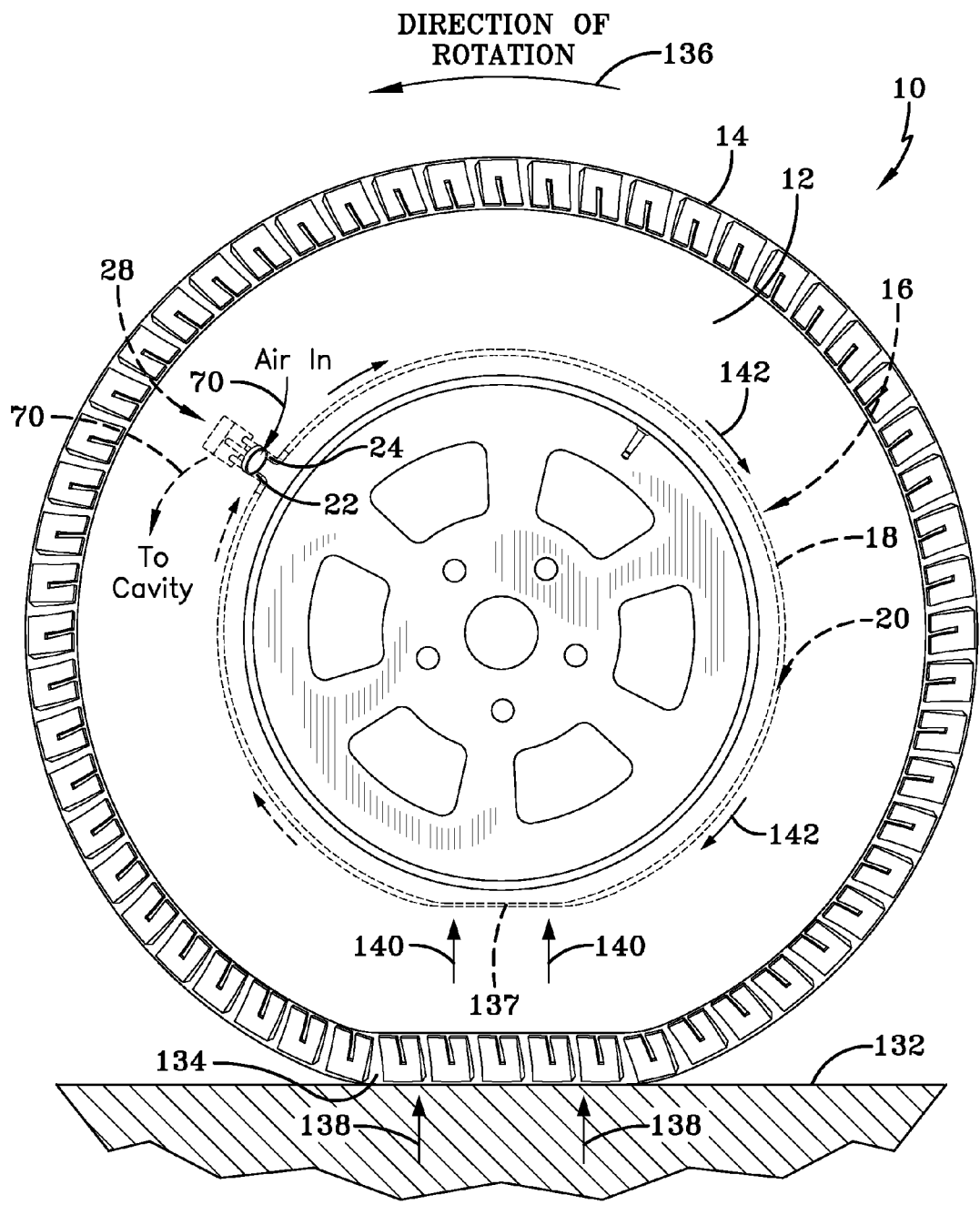
FIG. 2A is a side view of the tire and peristaltic pump assembly with the tire rotating counterclockwise and establishing a footprint against a ground surface.
Figure 2B:
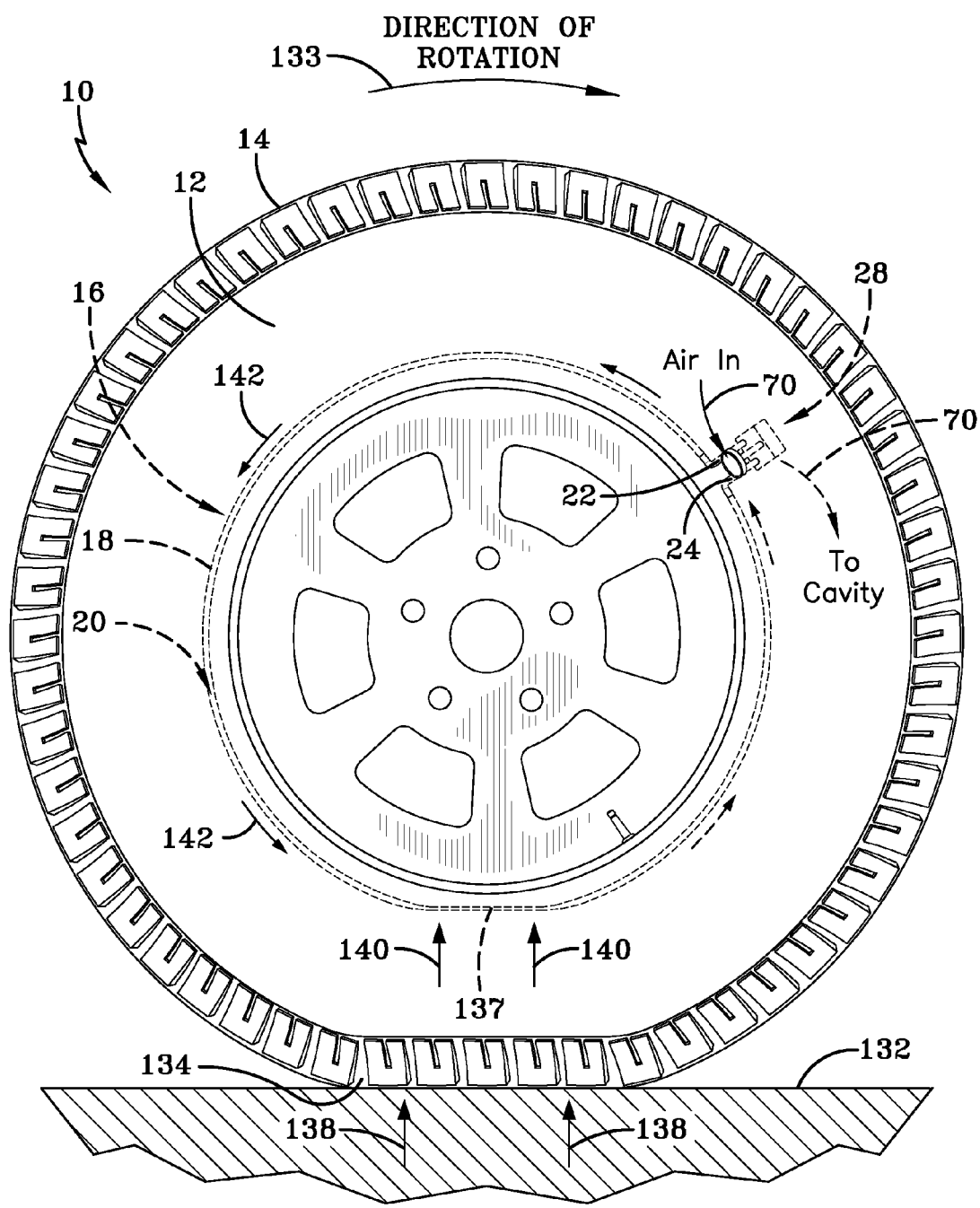
FIG. 2B is a side view of the tire and peristaltic pump assembly with the tire rotating clockwise against a ground surface.

As the tire rotates in both forward and rearward directions 136, 133 of FIG. 2A or 2B, the air passageway 20 is flattened segment by segment whether the passageway is in the form of a separate sidewall embedded tube or an integrally formed void. The segment by segment 137 sequential flattening of the air passageway moves in a direction 142 opposite to the direction of tire rotations of FIGS. 2A and 2B. The sequential flattening of the passageway 20 segment by segment causes evacuated air from the flattened segments to be pumped in the direction 142 to the inlet port assembly 28 where the air is directed to the tire cavity. Air pressure within the cavity 26 is thus maintained at a desired threshold pressure. Air admitted by the inlet port assembly 28 is introduced into the air passageway 20 to replenish air pumped into the tire cavity or recirculated out of the pump assembly if not needed to maintain tire pressure at a desired level.

Figure 3A:
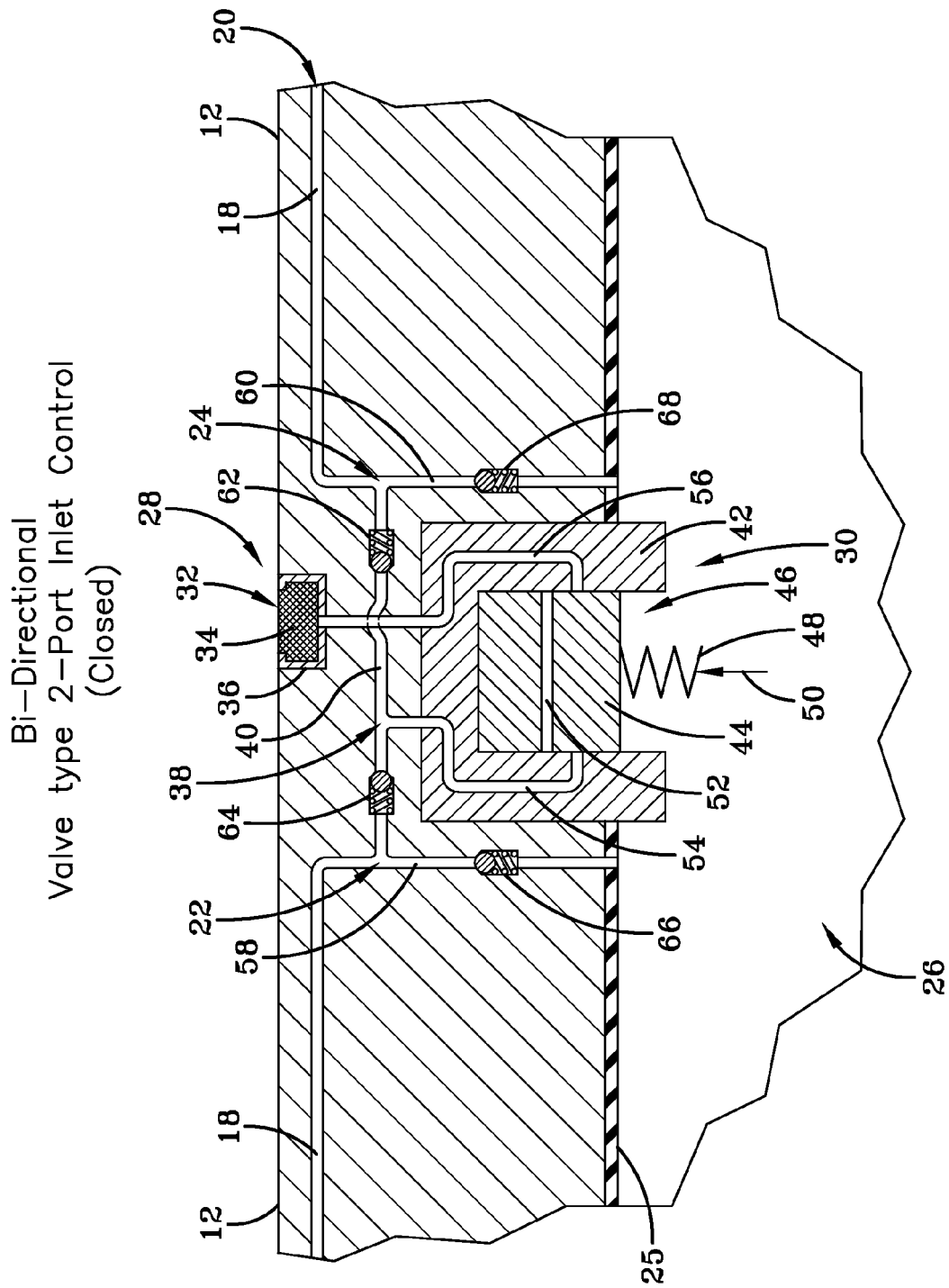
FIG. 3A is a cross sectional schematic diagram of the inlet portal of the peristaltic pump having a two-port inlet control valve in the closed position.
Figure 3B:
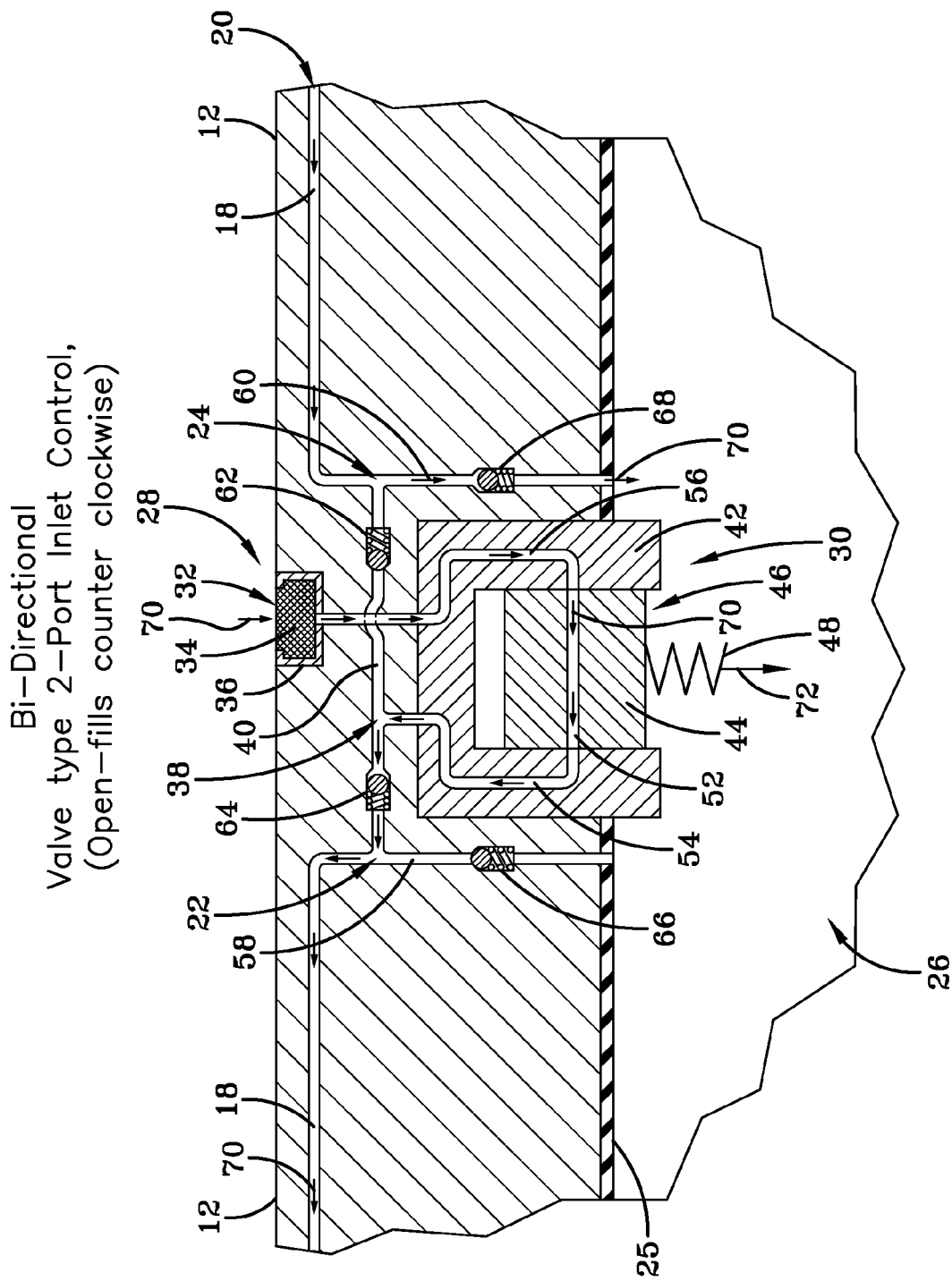
FIG. 3B is a cross sectional schematic diagram of the inlet portal of the peristaltic pump having a two-port inlet control valve in the open position operable to fill the tire with the tire rotating in a counter clockwise direction.
Figure 3C:
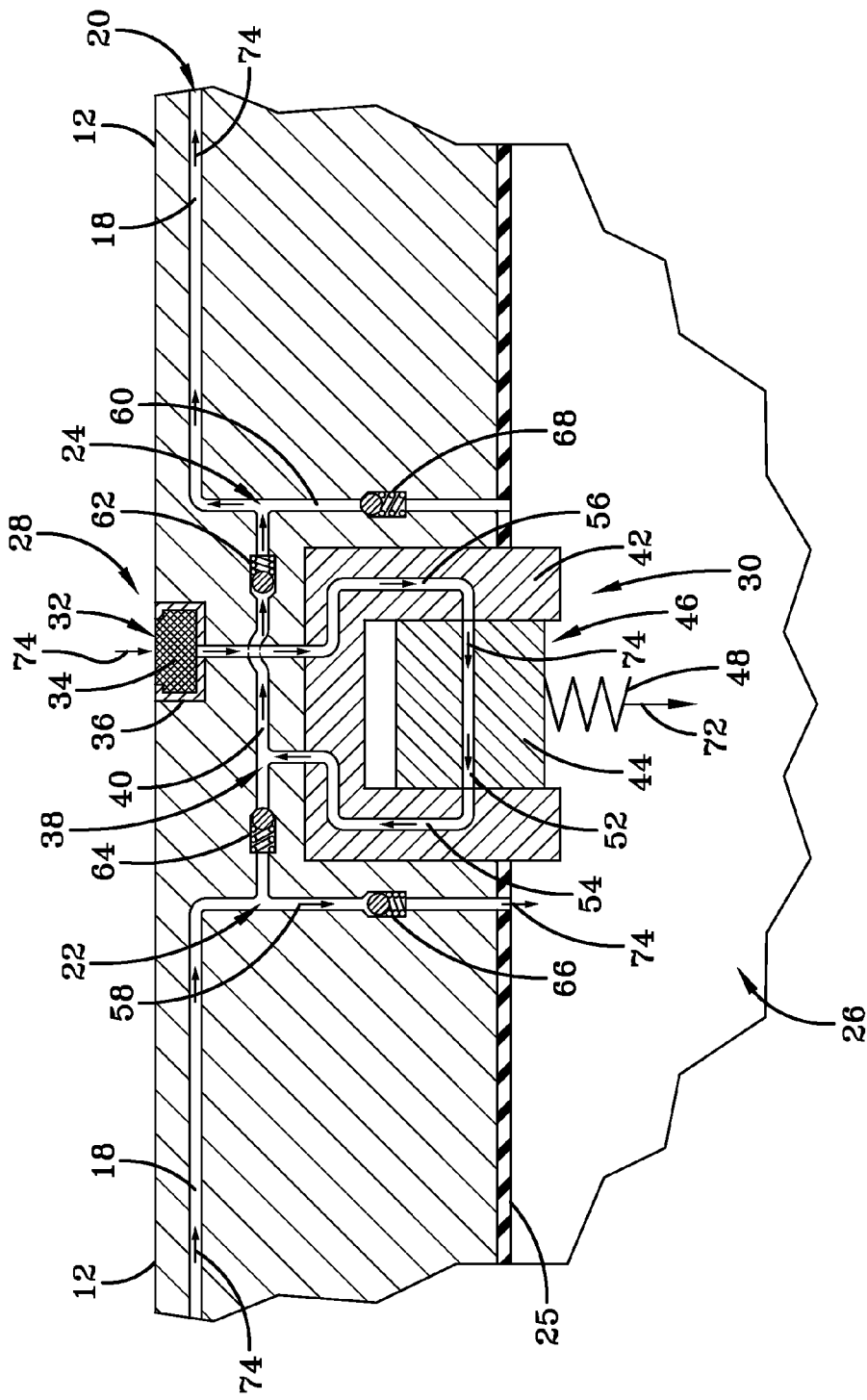
FIG. 3C is a cross-sectional schematic diagram of the inlet portal of the peristaltic pump bi-directional valve having two-port inlet control which fills the tire with the tire rotating in a clockwise direction.

The inlet port assembly 28 includes a regulator valve assembly 30 and a filtered air entry port 32. A two port, bi-directional inlet control embodiment is shown in FIGS. 3A through 3C. FIG. 3A representing the Inlet Control in the closed position; FIG. 3B shows the Inlet Control open with air flow moving counter-clockwise and the tire rotating clockwise; and FIG. 3C shows the Inlet Control open with air flow moving clockwise and the tire rotating counter-clockwise. It will be appreciated that the system is bi-directional, with air flow within the passageway 20 occurring in both directions as the tire rotates, with the direction of air flow within the passageway 20 dictated by the tire rotating in either a forward or reverse direction. Pumping along passageway 20 occurs in both directions, alternatively, throughout an entire 360 degree rotation of the tire.

A filtered air entry port 32 is positioned at the outer surface of a tire sidewall 12 and outside air is admitted into the entry port through a cellular filter 34 housed within a cylindrical housing 36. FIG. 3A shows the assembly in the closed condition in which air from outside the tire is prevented from entering the entry port 32; a condition which will occur when the pressure within the tire cavity 26 is at or above a regulated pressure threshold Preg. An air passageway conduit 56 extends from the filter housing 36 to the regulator valve assembly 30 and passes inlet air to the valve assembly. From the regulator valve assembly 30 an outlet conduit 54 carries air flow to a connecting conduit 40 which conducts air flow into oppositely directed valves 62, 64 positioned adjacent and on opposite sides of the inlet junction 38. As used herein, "inlet junction" refers to the location of passageway branching of inlet air from the assembly 28 to the upstream sides of inline stop valves. Alternative configurations of the system are shown by FIGS. 3A through 3C, 4A through 4C, and 5A through 5D wherein the inlet junction for each are placed as will be explained for the differing valve configurations.

The regulator valve assembly 30 provides a valve housing 42 and valve piston 44 residing within a cylinder or housing chamber 46. A biasing mechanism such as a spring 48 exerts a biasing force (see arrow 72 in FIGS. 3B, 3C) on the piston 44, biasing the piston downward within cylinder 46 into an "open" or "tire-fill" location and position as indicated in FIG. 3B and FIG. 3C. When the pressure within the cavity 26 is at or greater than the Preg pressure setting level, the pressure will overcome the biasing force of spring 48 and force (see arrow 50) the piston upward within cylinder 46 into the "closed" or "no-fill" location and position of FIG. 3A. The piston 44 is provided with a transversely extending air conduit 52 extending across the piston body. In the "closed" position of FIG. 3A, the conduit 52 is misaligned with respect to the air conduits 54, 56 and air cannot flow across the piston to conduits 54, 56, and from there to the inlet junction 38. In the "closed" position, consequently, air flow is prevented from reaching the inlet control junction 38 and hence, prevented from reaching the upstream sides of valves 62, 64. Air flow into the passageway 20 is thus precluded with the valve assembly 30 in the closed position of FIG. 3A.

FIG. 3B shows the valve assembly 30 moving to an "open" position. In the "open" position, the tire rotates in a clockwise direction, causing air to be pumped along passageway 20 in a counter clockwise direction. A configuration of four one-way valves are provided and located as shown. Two inline valves 62, 64 are positioned along the conduit 40 on opposite side of the inlet junction 38. The two inline valves 62, 64 open in opposite directions along the conduit 40 and conduct air flow in such respective directions with the valves 62, 64 in an open condition. Conduit 40 connects at the downstream side of the valves 62, 64 with the air passageway 20. From the juncture of passageway 40 and the passageway 20, radially extending outlet conduit passageways 58, 60 extend to the tire cavity 26 as shown. Positioned along the conduits 58, 60 are two outlet one-way valves 66, 68, respectively. The valves 66, 68 are oriented to open in a direction toward the tire cavity to permit the flow of air through the valves 66, 68, along conduits 58, 60, and into the tire cavity 26.

The one-way valves 62, 64, 66, and 68 are of a type commercially available such as ball or diaphragm check valves or other known valve configurations. The valves are oriented to open in the direction shown when pressure at an upstream side of the valve overcomes a biasing spring and forces the ball away from its seat. The piston 44 moves downward under the biasing force exerted by actuator spring 48. When the air pressure, Preg, within the cavity 26 falls below a desired pressure threshold limit. Movement of the piston aligns the air conduit 52 across the piston 44 with the conduits 54, 56, allowing inlet air from the inlet filter port 32 to flow across the piston conduit 52 to the inlet control junction 38 and to the connecting conduit 40. The tire, in rotating clockwise against the ground surface 132 (See FIG. 2B), collapses the passageway 20 segment by segment opposite the created tire footprint 134. The collapsed segments create a vacuum which, in turn, are refilled segment by segment by a flow of air within the passageway in a counterclockwise direction 142, drawn in through the inlet port assembly 28. The counterclockwise flow of input air forces the one-way valve 64 open, allowing the air to flow into the passageway in the counterclockwise direction shown. The air circulates around the passageway 20. When the air flow reaches the juncture of conduit 40 and radial outlet conduit 60, it cannot flow through the closed valve 62 and must, instead, flow to the outlet valve 68. The air flow forces the valve 68 open and continues on to input air into the tire cavity 26 as indicated by the arrow 70. When air pressure within the tire cavity 26 reaches the desired preset level, tire pressure against piston 44 forces the piston into the closed position of FIG. 3A and air flow to the cavity is discontinued as explained previously.

The above operation of the peristaltic pump assembly 16 operates the same in the reverse tire rotation direction, as will be understood from FIG. 3C. In FIGS. 2A and 3C, with the tire rotating in the counterclockwise direction, air is pumped in the clockwise direction 142. FIG. 3 shows the inlet port assembly 28 and the regulator valve assembly 30 in such a condition. If pressure within the cavity 26 is below the preset Preg level, the piston 44 is biased by spring 48 into the open position shown. The piston conduit 52 aligns with the conduits 54, 56 and air flow is directed to the junction 40. Rotation of the tire in the counterclockwise direction causes the flow of air to be in the clockwise direction 74 as evacuated segments of the passageway 20 are refilled. Air flow in the clockwise direction opens the one way valve 62 and allows air to circulate from the conduit 40 into passageway 20. The pressurized air circulates passageway 20 and enters conduit 58 where it is directed against valve 66, opening the valve, and thereby passing through valve 66 to the tire cavity 26 as indicated by arrow 70 of FIG. 3C. As with the FIG. 3, when the air flow reaches the juncture of conduit 40 and radial outlet conduit 58, it cannot flow through the closed valve 64 and must, instead, flow to the outlet valve 66. The air flow that forces the valve 66 open continues to input air into the tire cavity 26 as indicated by the arrow 70. When air pressure within the tire cavity 26 reaches the desired preset level, tire pressure against piston 44 forces the piston into the closed position of FIG. 3A and air flow to the cavity is discontinued as explained previously.

Figure 4A:
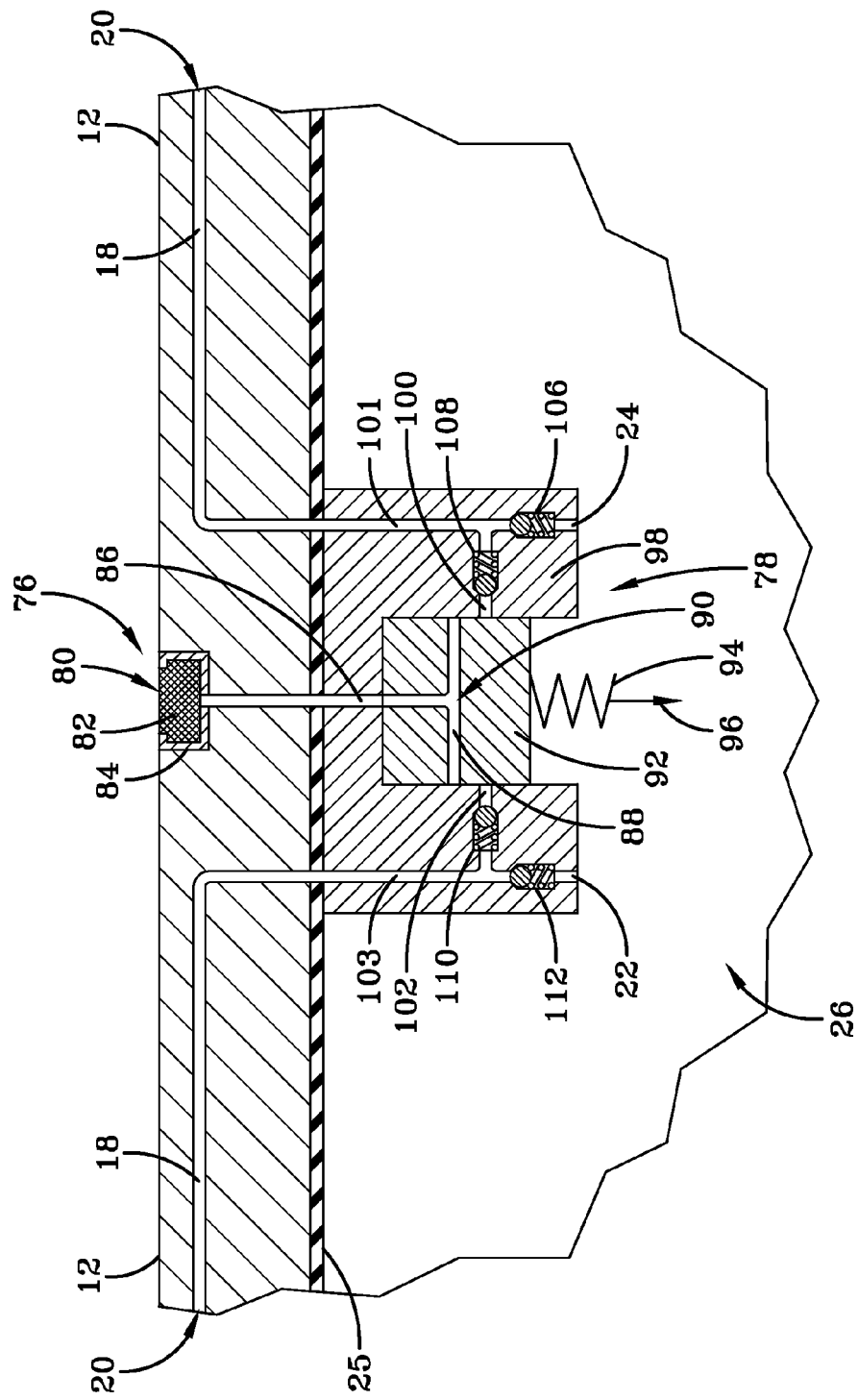
FIG. 4A is a cross sectional schematic diagram of the inlet portal of the peristaltic pump having an alternatively configured bi-directional five-port inlet control valve in the closed position.
Figure 4B:
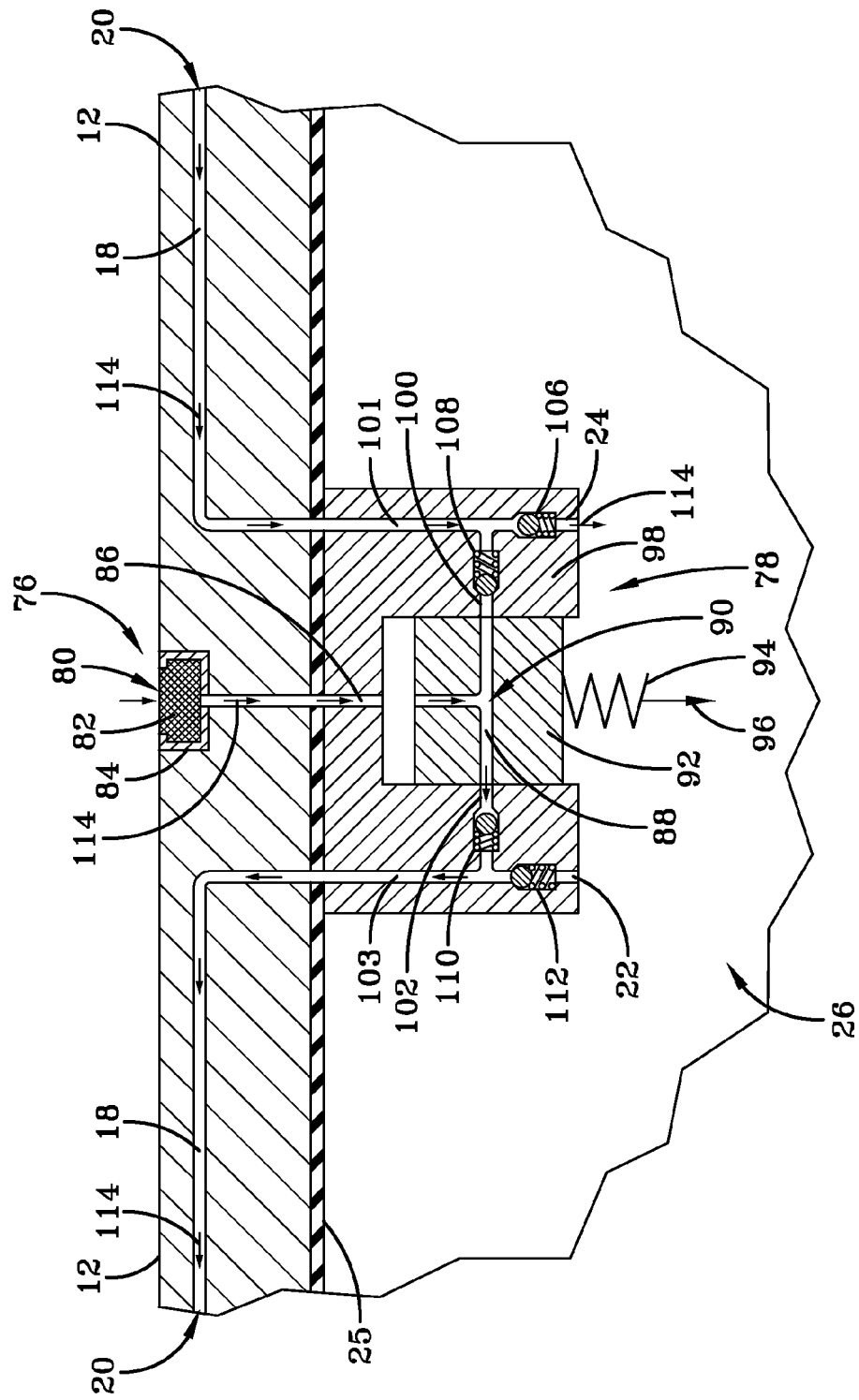
FIG. 4B is a cross sectional schematic diagram of the inlet portal of the peristaltic pump having an alternatively configured bi-directional five-port inlet control valve shown in the open position operable to fill the tire with the tire rotating in a counter clockwise direction.
Figure 4C:
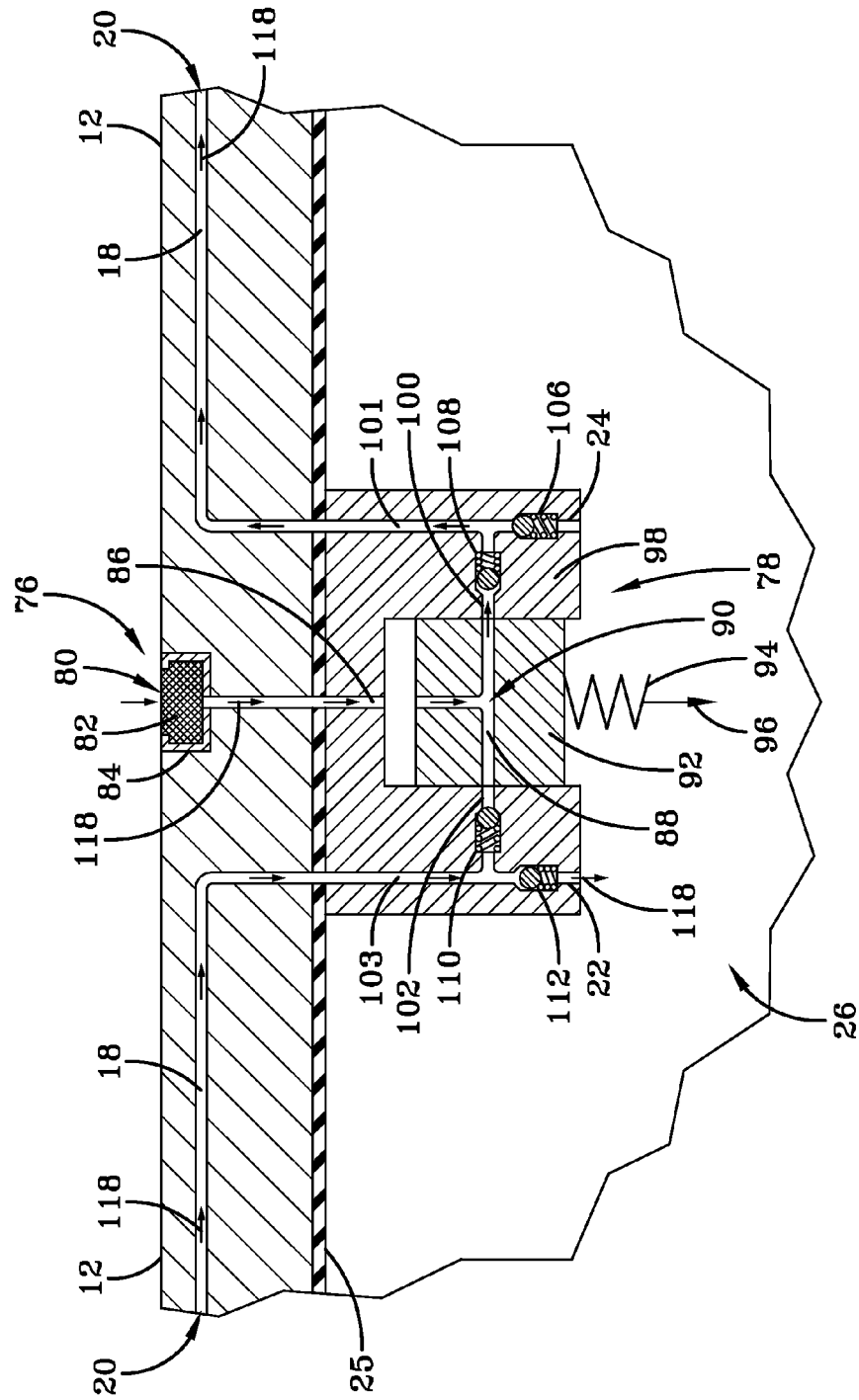
FIG. 4C is a cross-sectional schematic diagram of the inlet portal of the peristaltic pump bi-directional valve having an alternatively configured five-port inlet control which fills the tire with tire rotating in a clockwise tire rotation.

FIGS. 4A through 4C show an alternative embodiment in which the regulator valve assembly 78 is a 5-port inlet control configuration. It will be appreciated that alternative valve configurations may be employed in the practice of the invention and that the system is not dependent upon the use of a particular valve. In FIG. 4A, the valve is in the closed position in which air is not input into the tire cavity 26. FIG. 4B shows the valve in the open position with a tire clockwise rotational direction and air flow in the counter clockwise direction. FIG. 4C shows the valve in the open position during a counterclockwise tire rotation and clockwise air flow direction. As will be appreciated, in the valve shown in FIGS. 4A through 4C, air is admitted into the system through inlet port assembly 76 to the regulator valve assembly 78. Port assembly 76 includes a filter inlet port 80 and a filter body 82 housed within filter housing 84. Air passing through the filter 82 is directed via inlet conduit 86 to a transverse piston conduit 88. The junction 90 created by intersection of the inlet conduit 86 and piston conduit 88, in the alternative embodiment, is located within the piston 92. The piston 92, as in the first embodiment, is biased by spring 94 in an open condition represented by FIGS. 4B and 4C should the air pressure within cavity 26 be less than a preset Preg level. If air pressure within the cavity 26 is at or above the Preg level, the cavity air pressure overcomes the biasing spring 94 and moves the piston 92 upward within cylinder 98 into the closed position of FIG. 4A. In the closed position, no air is pumped into the cavity.

The transverse conduit 88 of the piston aligns with bridging conduits 100, 102 in the open-valve conditions of FIGS. 4B and 4C and misalign with bridging conduits 100, 102 when the valve is closed as shown in FIG. 4A. Four one-way valves 106, 108, 110, and 112 are positioned, the valves 108 and 110 representing the inline valves and the valves 112 and 106 the outlet valves. The inline valves 108, 110 open in opposite directions away from the junction 90 and the outlet valves 112, 106 open radially inward toward the tire cavity 26. The outlet valves 112, 106 reside within outlet conduits 103, 101, respectively, which couple to the passageway 20. The conduits 103, 101 intersect and connect with the bridging conduits 102, 100 respectively, and continue radially inward beyond the outlet valves 112, 106 to exit ends 22, 24 at the tire cavity 26.

Operation of the five port valve configuration of FIGS. 4A through 4C operates analogously to that explained previously in regard to the two-port valve of FIGS. 3A through 3C. FIGS. 2B, 4B shows the regulator valve open with the tire rotating clockwise and causing a counterclockwise flow of air within passageway 20. Air admitted through the input valve assembly 76 is directed to the junction 90 in piston 92 by means of conduit 86. At the junction 90, the air flow is prohibited from passing through the closed valve 108 and opens the valve 110.

The air flow circulates in direction 114 within the passageway 20 to enter into the conduit 101. Air flow at the junction of conduit 101 and the bridging conduit 100 cannot pass through the closed valve 108 and thus is directed to open valve 106, allowing the pumped air flow to enter into the tire cavity 26.

FIGS. 2A and 4C show operation of the regulator valve with the tire rotating in a counterclockwise direction 136 to pump airflow within passageway 20 in a clockwise fill direction 118. Air flow 118 in the passageway 20 is directed to the tire cavity 26 as indicated. Operation of the valve in the tire rotation direction and counter air flow direction in FIGS. 2A and 4C proceeds as explained above. When air pressure within the tire cavity 26 reaches the desired preset level, tire pressure against piston 92 forces the piston into the closed (conduit-misaligned) position of FIG. 3A and air flow to the cavity is discontinued. A pressure within the cavity 26 below the preset desired threshold level, causes the piston 92 to move into the open position of FIG. 4B or 4C, and air to flow in the passageway 20 in the direction indicated as dictated by the direction of tire rotation. Pumping of air continues throughout the 360 degree rotation of the tire and, as shown, occurs regardless of whether the tire (and vehicle) is going in the forward or reverse directions.

Figure 5A:
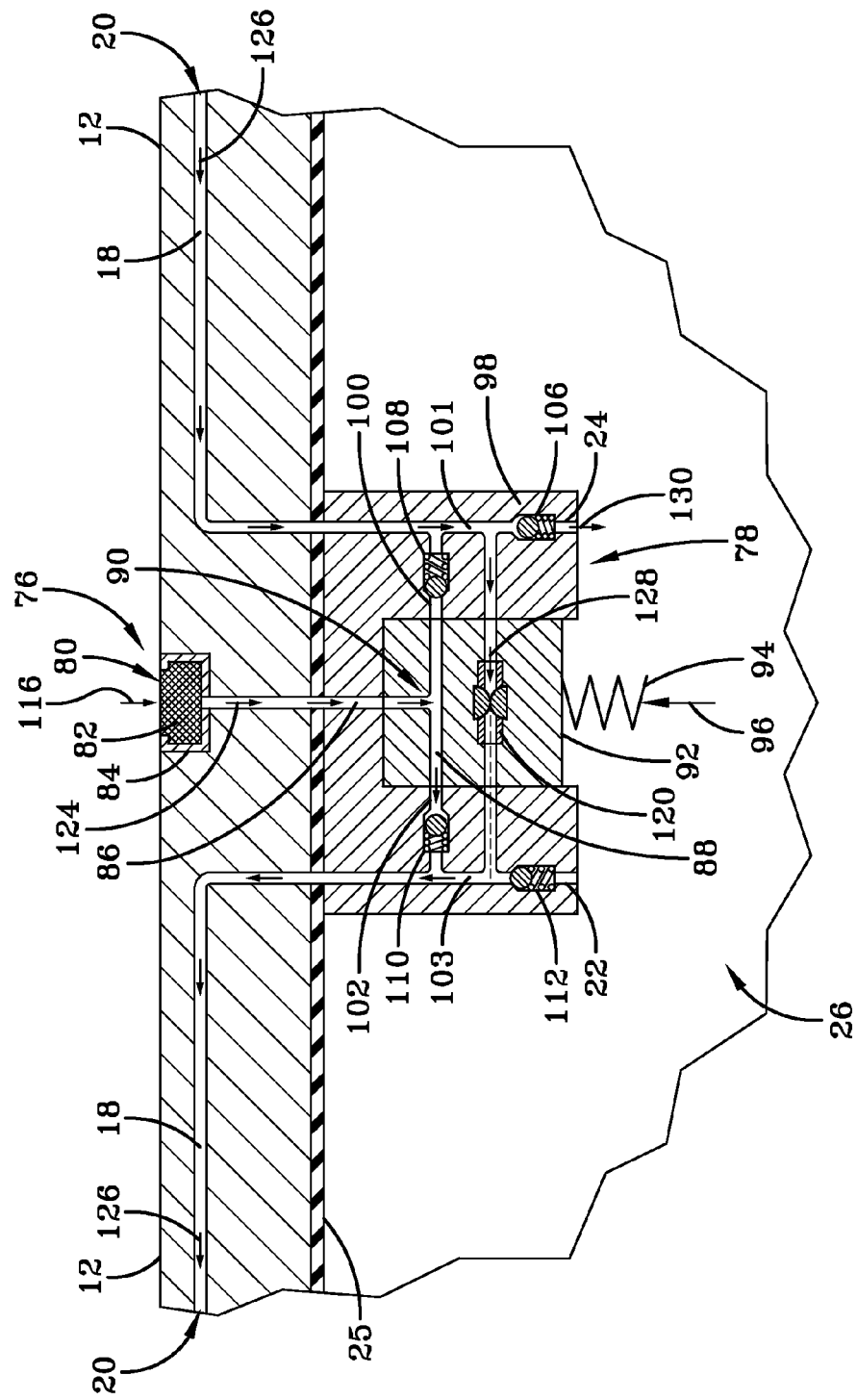
FIG. 5A is a cross-sectional schematic diagram of the inlet portal of an alternative peristaltic pump bi-directional valve filling a tire with the tire in a counter-clockwise rotation in which the valve has incorporated therein a five port regulator.

FIGS. 5A through 5D show the a third alternative embodiment of the regulator valve assembly 78 modified by the inclusion of a bypass valve 120. The valve 120 is a pressure controlled valve of a type commercially available that is connected to bypass the opening of check valves 106, 112 when the pressure within the tire cavity 26 exceeds a Pset or Preg value. The bypass valve 120 is intended to ensure that air cannot be introduced into the tire cavity 26 when the air pressure within the cavity is at or greater than the Pset pressure threshold. The bypass valve 120 is positioned to conduct air in either direction when the pressure within the cavity 26 is at or greater than the Pset value, whereby bypassing air to the outlet valves 106, 112 and preventing the introduction of more air into the cavity. Bypass valve 120 connects to the conduit spanning the piston 92 and connecting to the conduits 101, 103 at opposite ends. FIG. 5A shows the 5-port Bypass Regulator with the cavity pressure below Preg or Pset; the tire rotating in a clockwise direction, and fill air rotating about the passageway 20 in a counterclockwise direction. It will be noted that in the Bypass Regulator embodiment of FIGS. 5A through 5D, the piston 92 does not move between an aligned, open, orientation to the conduits 100, 102 and a closed, misaligned, orientation but remains in alignment in all fill modes.

Figure 5B:
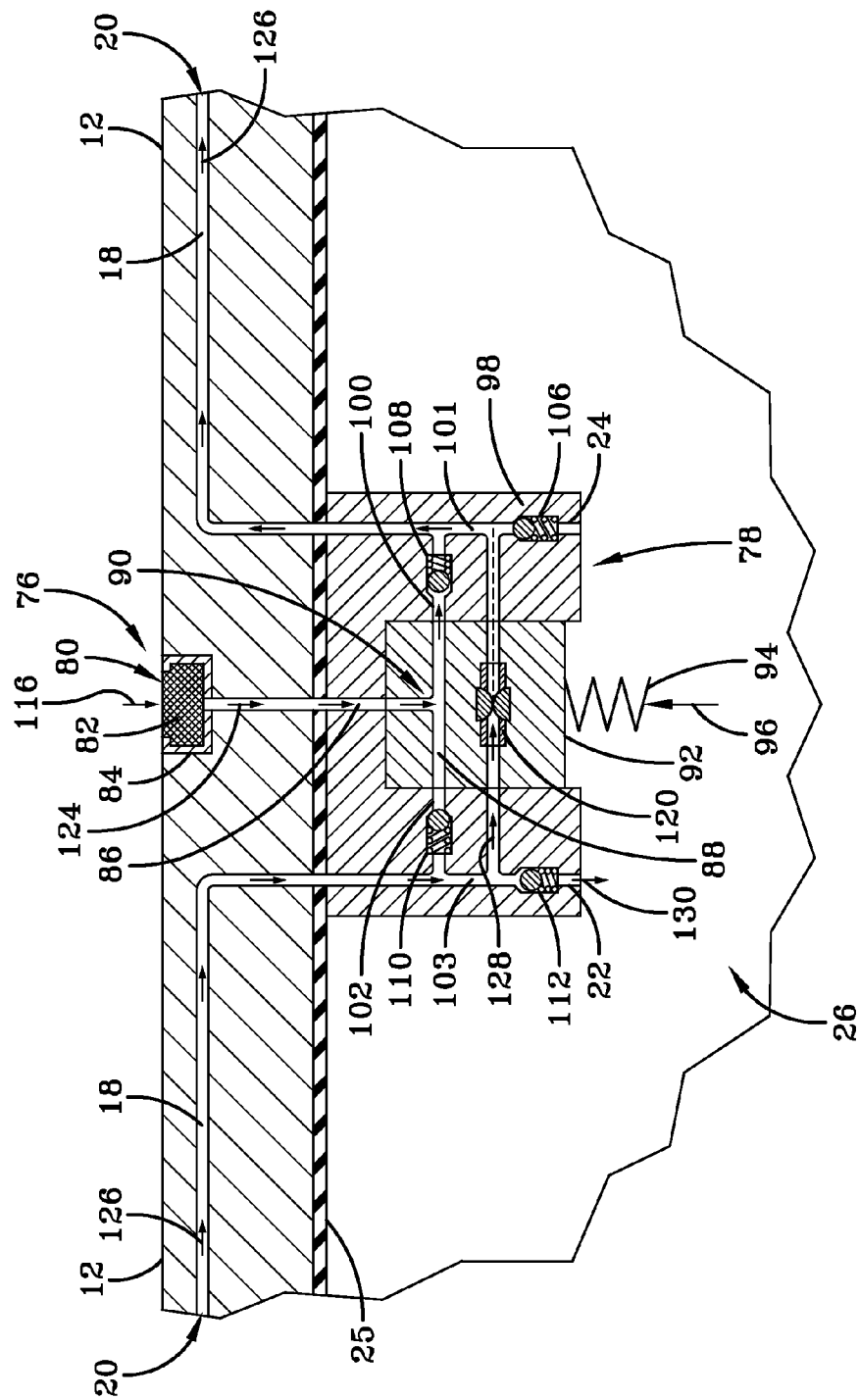
FIG. 5B is a cross-sectional schematic diagram of the inlet portal of the FIG. 5A alternative peristaltic pump bi-directional valve filling a tire with the tire in a clockwise rotation and showing the five port regulator.
Figure 5C:
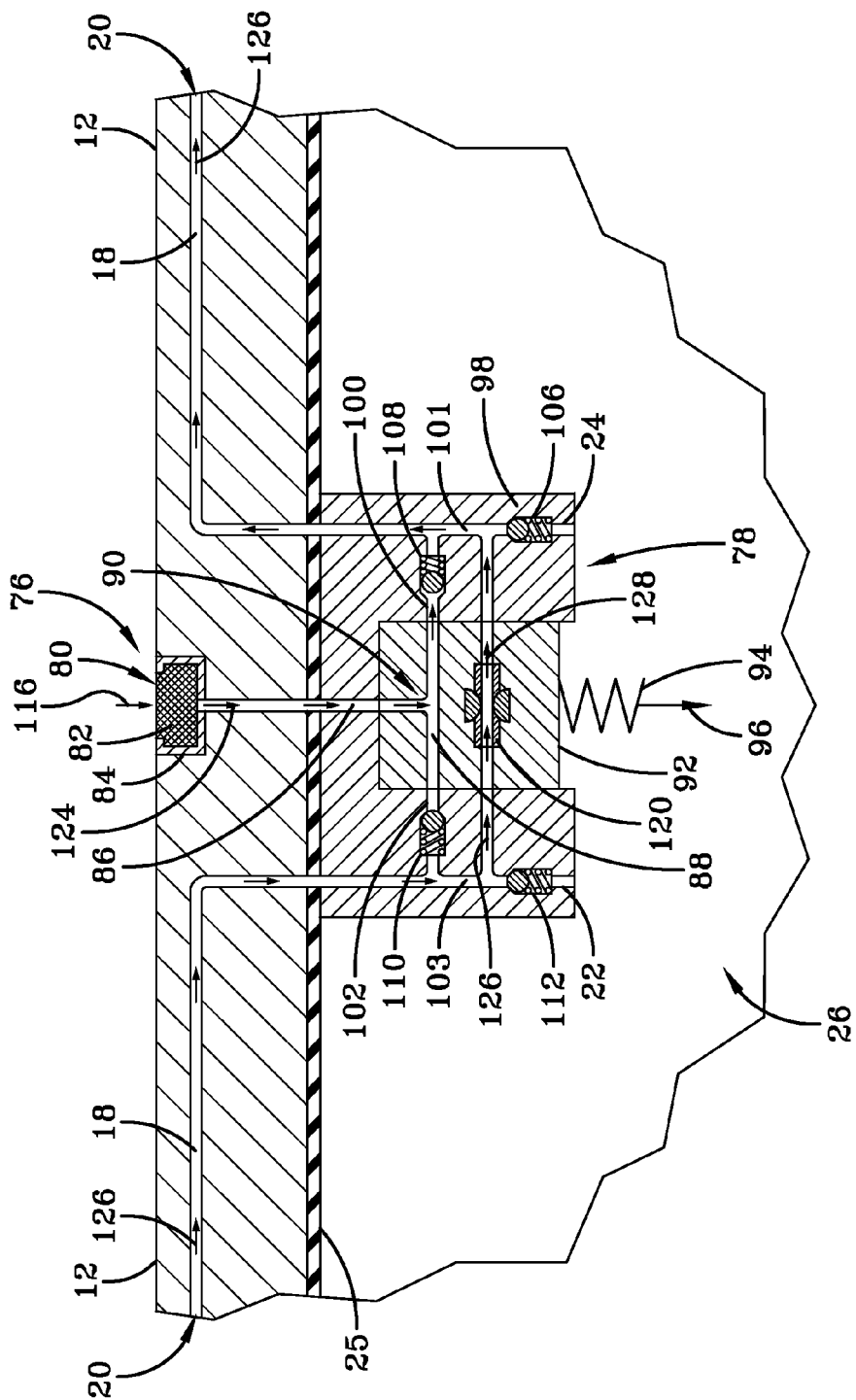
FIG. 5C is a cross-sectional schematic diagram of the inlet portal of the FIG. 5B alternative peristaltic pump bi-directional valve with clockwise tire rotation and the valve in a bypass mode.
Figure 5D:
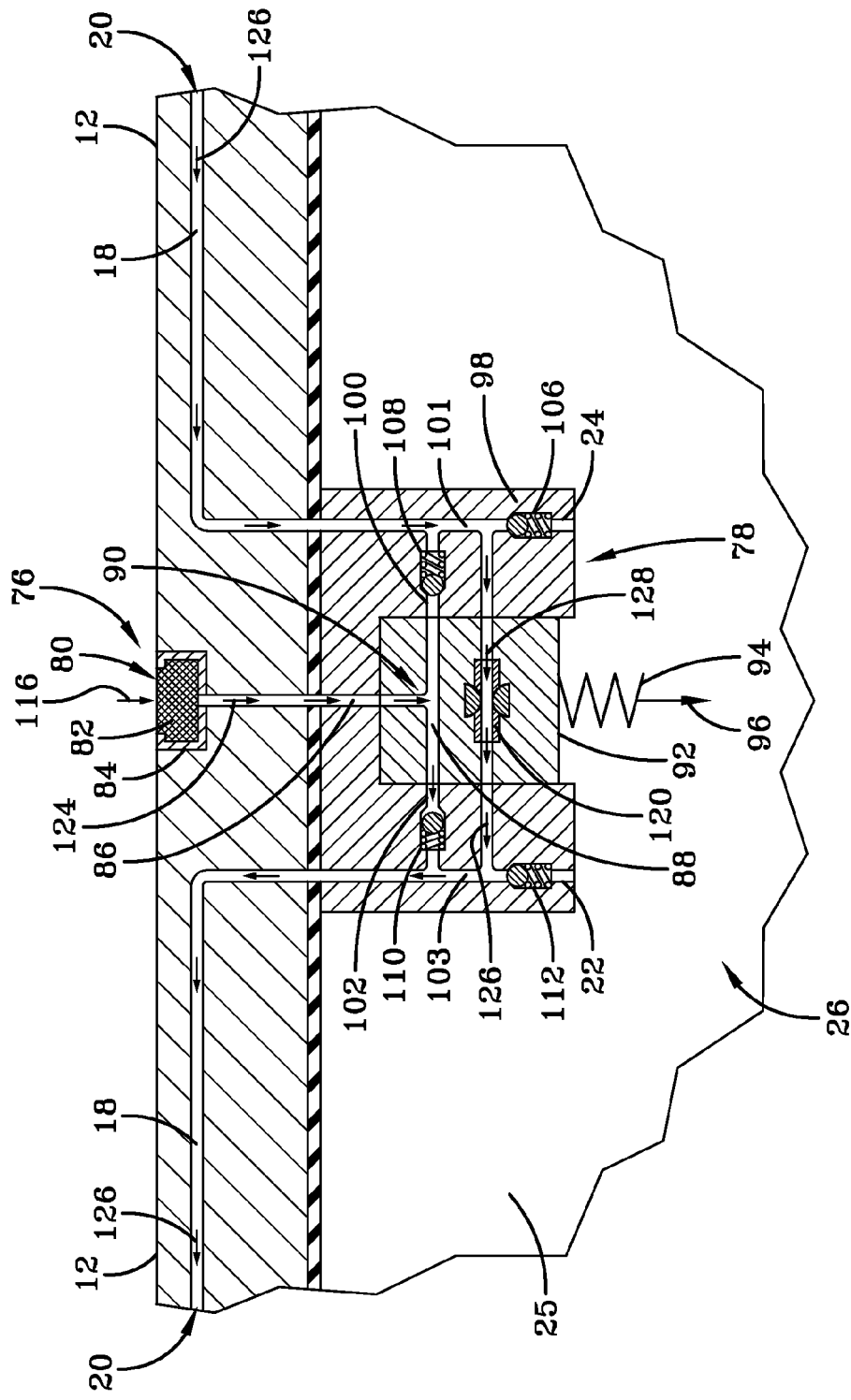
FIG. 5D is a cross-sectional schematic diagram of the inlet portal of the FIG. 5B alternative peristaltic pump bi-directional valve with counter-clockwise tire rotation and the valve in a bypass mode.

With reference to FIG. 5A, the cavity pressure is below Pset, causing the Bypass valve 120 to be closed. With the Bypass valve 120 closed, the operation of the Regulator and air passageway 18 proceeds as explained above in reference to the second embodiment under the conditions of FIG. 4B. FIG. 5A and FIG. 4B both represent a clockwise rotation of the tire, flow of air into (arrow 124) the system through filter inlet port 80, and a counterclockwise flow of air (arrow 126) within passageway 20. In FIG. 5B, for a counterclockwise rotation of the tire and a clockwise fill direction, the Bypass valve 120 continues to remain closed so long as the cavity pressure remains below Preg. Air flow (arrow 128) along the bypass conduit is thereby blocked by the closed valve 120. The air flow and fill direction in FIG. 5B thus proceeds as explained previously under the same analogous conditions under which the regulator of FIG. 4 operates. Air circulating in FIG. 5B in the clockwise direction acts to open the outlet valve 112 and pass air in direction 130 into the tire cavity. In FIG. 5C, with the cavity pressure at or greater than the Preg threshold, air circulated in the clockwise direction bypasses the outlet valves 106, 112, passing instead through the opened bypass valve 120. The valves 106, 112 thus remain closed and none of the circulated air (arrow 126) will pass through the valves 106, 112 and enter the tire cavity. FIG. 5D shows the operation of the Bypass Regulator during an opposite, clockwise rotation of the tire and a counter clockwise air flow path. As with FIG. 5C, the tire cavity pressure in FIG. 5D is greater than Preg, causing the bypass valve 120 to open and directing the counterclockwise air flow (direction arrow 126) through the bypass valve path rather than opening and moving through the outlet valves 106, 112. Air flow into the tire cavity is thus precluded. The Bypass Regulator thereby ensures that under no circumstances will air be forced into a tire cavity when the pressure within the cavity is at or regulator is at or greater than the Preg set threshold.

From the foregoing, it will be appreciated that the peristaltic pump and regulator system provides the means for keeping the air pressure within a tire cavity at a desired pressure level but no greater pressure that the desired pressure. The pump assembly 16 includes the elongate annular air passageway 20 enclosed within a bending region of the tire. The air passageway 20 operatively closes and opens, segment by segment, as the bending region of the tire passes through a rolling tire footprint to pump air along the air passageway. The pump assembly further includes the air inlet port assembly 28 positioned to channel outside air into the air passageway 20 at an inlet junction (38 or 90). The pair of inline valves 62, 64 (or 108, 110) are positioned to direct a flow of the inlet air in opposite directions into the air passageway 20. The pair of outlet valves 66, 68 (or 106, 112), each are positioned at a downstream side of a respective inline valve, the outlet valves directing a bi-directional flow of the inlet air from the downstream side of a respective inline valve therethrough toward and into the tire cavity.

The inlet port assembly 28 further includes the control conduit extending between and conducting an inlet air flow between the air inlet portal and an upstream side of the inline valves. The piston 44 operates under the influence of valve spring actuator 48 to interrupt the inlet air flow through the control junction 38 and to the upstream side of the inline valves when the air pressure within the tire cavity is above the threshold air pressure level. The inline and the outlet valves are selectively opened by bi-directional air flow within the air passageway and dictated the forward and reverse directions in which the tire rotates.

While the above representations of the subject invention are as indicated in FIGS. 3A through 3C, FIGS. 4A through 4C and FIGS. 5A through 5D, the invention is not limited to the embodiments shown. The four check valves used for directionality can be anywhere in the tire pumping channel 20, attached to the tire inner liner surface 25, attached to the surface of the regulator housing, or completely integrated into the regulator as shown. Such deviations are within the knowledge of those of ordinary skill in the art. Similarly, while the embodiments shown represent two-port and five-port regulator configurations, other embodiments may be substituted without departing from the scope of the invention. Three and four port regulators may be substituted if desired. It will further be noted that, in the regulator embodiments shown, the air flow direction within the regulator must always come through the inlet filter 34 and always follows opposite to the tire rotation outside the regulator. It will further be understood in the Bypass Regulator embodiment, that the bypass conduit connects the two check valves, outlet valves 106, 112, that send high pressure compressed air into the tire. During the fill mode, air is not allowed to flow through the bypass passageway so long as the air pressure within the tire cavity is less than Preg. The air is thus directed to force open the outlet check valves and send the air into the tire. When the tire reaches the required pressure, the air is allowed to flow through the bypass valve. The air is thus circulated about the passageway 20 and through the regulator bypass passageway and is not compressed. Overfill of the tire cavity is thus prevented. The bypass valve positioned between the inline and the output valves thus provide a bypass when the tire cavity pressure is greater than Pset and introduce air into the cavity when the tire cavity pressure is less than Pset. The tire is thereby prevented from being inflated continuously due to a malfunction in the system.

The reversible peristaltic tire and pump assembly will work for any configuration of air pump passageway and for an angle of the passageway relative to the tire up to a 360 degree annular circumference. The system is functional for built-in air passageways or post cure attached tube-based passageways. The inline and outlet check valves may be integrated into the regulator housing design. Both Bypass (third embodiment) and Inlet Control (first and second embodiments) regulators are possible. Moreover, no dead volume(s) of air are created in the middle of the air flow path. Rather, the air flow paths are symmetric the inlet and outlet may be exchanged interchangeably without compromising functionality.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:
1. An air maintenance tire and pump assembly comprising:
a tire having a tire cavity, first and second sidewalls extending respectively from first and second tire bead regions to a tire tread region;
an elongate substantially annular air passageway enclosed within a bending region of the tire, the air passageway operatively closing and opening segment by segment as the bending region of the tire passes through a rolling tire footprint to pump air along the air passageway;
an air inlet port assembly coupled to and in air flow communication with the air passageway at an inlet air passageway junction, the air inlet port assembly operable to channel inlet air from outside of the tire into the air passageway;
a pair of substantially inline valves positioned on respective opposite sides of the inlet air passageway junction in air flow communication with the inlet port assembly; the inline valves operative to selectively open in respective opposite directions and pass a flow of the inlet air from an upstream valve side to a downstream valve side and into the air passageway,
a pair of outlet valves, each outlet valve positioned in air flow communication with a downstream side of a respective inline valve, the valves operative to selectively open and conduct a flow of the inlet air from the downstream side of a respective inline valve to the tire cavity; and
a bypass valve extending between the downstream valve sides of the inline valves, the bypass valve operative to open and bypass the flow of inlet air through the outlet valves to the tire cavity in the event that a tire cavity pressure is greater than a preset pressure level and close when a tire cavity pressure is less than the preset pressure level.

2. The air maintenance tire and pump assembly of claim 1, wherein the air passageway extends annularly within a substantially circumferential enclosed position within a tire sidewall.

3. The air maintenance tire and pump assembly of claim 1, wherein each of the outlet valves is positioned adjacent and in proximal relationship with the downstream side of a respective inline valve.

4. The air maintenance tire and pump assembly of claim 3, wherein the outlet valves open to conduct an outlet flow of air in a substantially radial direction to the tire cavity.

5. The air maintenance tire and pump assembly of claim 4, wherein the bypass valve opens bi-directionally to allow a bypass air flow into the air passageway in opposite directions with the bypass valve is in the open condition.

6. The air maintenance tire and pump assembly of claim 5, wherein the bypass valve has opposite bypass valve ends connecting respectively to the air passageway between a downstream side of a respective inline valve and an upstream side of a respective outlet valve.

7. The air maintenance tire and pump assembly of claim 6, wherein the direction of air flow through the bypass valve with the bypass valve in the open condition is dictated by alternative rotational directions of the tire.

8. The air maintenance tire and pump assembly of claim 7, wherein the outlet valves open and close responsive to air pressure at respective downstream sides of the inline valves.

9. An air maintenance tire and pump assembly comprising:
a tire having a tire cavity, first and second sidewalls extending respectively from first and second tire bead regions to a tire tread region;
an elongate substantially annular air passageway enclosed within a bending region of the tire, the air passageway operatively closing and opening segment by segment as the bending region of the tire passes through a rolling tire footprint to pump air along the air passageway;
an air inlet port assembly coupled to the air passageway at an inlet junction, the air inlet port assembly operable to channel inlet air from outside of the tire into the air passageway;
a pair of substantially inline valves positioned on respective opposite sides of the inlet air passageway junction in air flow communication with the inlet port assembly; the inline valves operative to selectively open in respective opposite directions and pass a flow of the inlet air from an upstream valve side to a downstream valve side and into the air passageway, and
a pair of outlet valves, each outlet valve positioned in air flow communication with a downstream side of a respective inline valve, the outlet valves operative to selectively open and conduct a flow of the inlet air from the downstream side of a respective inline valve toward the tire cavity; and
a bypass valve extending between the downstream valve sides of the inline valves, the bypass valve operative to open and bypass the flow of inlet air from the air passageway through the outlet valves to the tire cavity in the event that a tire cavity pressure is greater than a preset pressure level and close when a tire cavity pressure is less than the preset pressure level.

10. The air maintenance tire and pump assembly of claim 9, wherein the air passageway extends annularly within a substantially circumferential enclosed position within a tire sidewall.

11. The air maintenance tire and pump assembly of claim 10, wherein each of the outlet valves is positioned adjacent and in proximal relationship with the downstream side of a respective inline valve.

12. The air maintenance tire and pump assembly of claim 11, wherein the outlet valves open to conduct an outlet flow of air in a substantially radial direction to the tire cavity.

13. The air maintenance tire and pump assembly of claim 12, wherein the bypass valve opens bi-directionally to allow a bypass air flow into the air passageway in opposite directions with the bypass valve is in the open condition.

14. The air maintenance tire and pump assembly of claim 13, wherein the bypass valve has opposite bypass valve ends connecting respectively to the air passageway between a downstream side of a respective inline valve and an upstream side of a respective outlet valve.

15. The air maintenance tire and pump assembly of claim 14, wherein the direction of air flow through the bypass valve with the bypass valve in the open condition is dictated by alternative rotational directions of the tire.

16. The air maintenance tire and pump assembly of claim 15, wherein the outlet valves open and close responsive to air pressure at respective downstream sides of the inline valves.

* * * * *